United States Patent [19]

Rapaport et al.

[11] Patent Number: 4,482,662

[45] Date of Patent: Nov. 13, 1984

[54] WATER-SOLUBLE AEROSOL PAINT COMPOSITIONS

[75] Inventors: Stanley Rapaport, Shaker Heights; Francis J. Cachat, Rocky River, both of Ohio

[73] Assignee: Plasti-Kote Company, Inc., Medina, Ohio

[21] Appl. No.: 560,428

[22] Filed: Dec. 12, 1983

Related U.S. Application Data

[63] Continuation-in-part of Ser. No. 401,838, Jul. 26, 1982, Pat. No. 4,420,575.

[51] Int. Cl.$^3$ ............................ C09D 3/66; C09D 5/02
[52] U.S. Cl. .................................... 523/504; 106/252; 106/253; 524/903
[58] Field of Search ..................... 523/504; 524/903; 106/252, 253

[56] References Cited

U.S. PATENT DOCUMENTS

| | | | |
|---|---|---|---|
| 1,892,750 | 1/1933 | Rotheim | 222/1 |
| 2,795,564 | 6/1957 | Conn et al. | 526/317 |
| 2,985,602 | 5/1961 | Broadhead | 524/601 |
| 4,125,499 | 11/1978 | Howard | 524/612 |
| 4,240,940 | 12/1980 | Vasishth et al. | 524/903 |
| 4,265,797 | 5/1981 | Suk | 524/903 |
| 4,384,661 | 5/1983 | Page et al. | 524/903 |
| 4,420,575 | 12/1983 | Rapaport et al. | 523/504 |

FOREIGN PATENT DOCUMENTS

| | | | |
|---|---|---|---|
| 54-33545 | 3/1979 | Japan | 524/903 |
| 8104365 | 4/1982 | Netherlands | 524/903 |
| 2085466 | 4/1982 | United Kingdom | |

*Primary Examiner*—Ronald W. Griffin
*Attorney, Agent, or Firm*—Fay & Sharpe

[57] ABSTRACT

An aerosol paint system is provided under sprayable pressures in a pre-packaged container adapted for instant spray application. The paint composition comprises a water-soluble monomer modified alkyd resin binder composition having a low molecular weight less than about 10,000 and an acid value (before neutralization) of above about 30 and preferably less than about 80. The product is diluted so that it is in a ready-to-use form when purchased. The paint system may be pigmented or non-pigmented (as for use in clear transparent coatings). Spray coatings of this invention deposit continuous films from pressurized containers at will. Operable formulations comprise monomer modified alkyd resin binders made water-soluble by neutralization with bases in solution in aqueous solutions of water-soluble volatile organic solvents which may include a first group consisting of low molecular weight alcohols, ketones and esters and a second group of higher molecular weight co-solvents characterized by co-solvency and known as Cellosolves, cellosolve acetates, other esters and Carbitols. The second class is useful, but not essential. The coatings of this invention may contain prime (hiding) pigments, corrosion resistance pigments and inert pigments. All are well known to provide various colors, gloss control and other known effects. They are also useful in non-pigmented form for clear coatings. As the volatiles are predominantly water, fire hazards in storage and use are minimal.

9 Claims, No Drawings

WATER-SOLUBLE AEROSOL PAINT COMPOSITIONS

This application is a continuation-in-part of copending U.S. patent application Ser. No. 401,838, filed July 26, 1982, now U.S. Pat. No. 4,420,575, issued Dec. 13, 1983.

SUMMARY OF THE INVENTION

Aerosol paint systems in ready-to-spray apply containers are well established. Initially aerosol paints were formulated containing major amounts of combustible varnish binders, solvents and propellants. More recently, halogenated propellants became suspect of long-term pollution effects, although fire retardant. The prior art has introduced aerosol paint systems which may contain up to about 10% water as a maximum. Warehouse storage, because of the pressure and volatitity of the largely combustible content of aerosol paint packages, has priorly had inherent conflagration potential.

The aerosol paints of this invention provide a ready-to-spray apply pigmented paint or clear varnish under above atmosphere pressure in which the predominant combustible components are water-soluble, including the propellant phase as well as the binder phase. The principal volatility of the aerosol paint combination is a solvent system in which water is a major component.

An aerosol paint formulation is provided which comprises a water-soluble monomer modified alkyd resin system as the sole non-volatile organic binder component. The monomer modified non-volatile alkyd solid resin is characterized by an acid value of not less than 30 nor more than 80 (based on said solids) before neutralization with water-soluble bases. The molecular weights are less than about 10,000, but preferably between 2,000 and 6,000 are dispersed when in aqueous solution to form a transparent vehicle system containing non-volatile solid components of the paint system which constitute from about 5 to about 30% by weight of the total aerosol paint.

A second volatile component other than water comprises a group of organic co-solvents which are also water-soluble low molecular weight alcohols, ketones and esters which volatilize relatively rapidly from deposited paint films. Still another class of higher molecular weight volatile organic co-solvents may also be used which include higher boiling glycol-ethers and esters which assist in development of the full potential gloss of dried films deposited as protective and decorative coatings.

A limitation in the molecular weight range of the water-soluble monomer modified alkyd resins is the particle size of the polymer in the aqueous phase.

The monomer modified alkyd resin solids should be sufficiently dispersed in the aqueous phase so that there is very little or no light scattering effect, although some small degree of translucence is permissible due to some minor amount of polymer above the average molecular weight and particle size of the preferred ranges. Particle sizes of the dispersed binder phase should not exceed about 0.05 microns in the preferred practice of this invention.

The water-reducible monomer modified alkyd resins of relatively low molecular weight essential here are made water-soluble by neutralization of their acid values to a pH of about 8.0 to 8.5 with low molecular weight amines, ammonia and lithium bases; preferably using basic lithium compounds (illustratively lithium hydroxide and carbonate) as an initial neutralizer to about 20–50% of the acid value of the alkyd and completing the alkaline pH shift with ammonia or amine to pH of about 8.5.

The propellant is also soluble in water. A major proportion of the propellant acts as a co-solvent for the herein described polymeric binder resins when in the pressurized container or package. The solvent portion of the propellant is preferably dimethyl ether and generally constitutes less than half (25–50%) of the total aerosol paint system by weight of the packaged aerosol paint product of commerce. Minor proportions of other propellant hydrocarbons including propane, butane, isobutane and the class of fluorochlorohydrocarbons, well known in aerosol products, can be used for a part of the propellant phase.

Water constitutes an essential part of the volatile components and is a co-solvent with the propellant dimethyl ether and the volatile alcohols and ketones in the pressurized state.

Avoidance of emulsion phase products eliminates the complexity associated with the meta-stable paint dispersions of the prior art which incorporate them and eliminates the instability inherent in the phase incompatible emulsion systems due to alternate freeze-thaw cycles.

BACKGROUND OF THE INVENTION

Aerosol paints using conventional solvent reduced pigmented organic polymeric binders have found wide acceptance because of their ready availability to apply paint coatings without concomitant clean up problems associated with brushing applications and brush-marks foreign to spray coating applications. Until recently, aerosol paints were substantially and conventionally water-free, solvent thinned products formulated with propellants of the fluorochlorohydrocarbon class. Concern over flourinated hydrocarbon propellants in the atmosphere gave impetus to use of non-halogenated (non-fluorinated) propellants, primarily low molecular weight hydrocarbons such as butane, propane, hexane, heptane, etc., which are flammable.

With rapid development of water-reducible paint systems characterized by ease of application, ready clean up, and freedom from fire hazard, water-containing systems for aerosol paints are of major interest. Water-containing aerosol spray paints have the advantage of low toxicity levels, noncombustible spray paint systems, and in some cases ready clean up with soap and water after completion of the paint application.

The following patents are of interest in the development of the aerosol paint art and the present invention:

Howard U.S. 4,187,204, takes advantage of resinous synthetic polymers or paint binders; illustratively, maleinized oils, oil modified alkyds, copolymer oils, epoxy resins, etc., having sufficient carboxyl groups (acid value) to be solubilized in water by neutralization of the acid groups present. Howard's product may contain some water, but not more than 10%. Acid values of the resins were neutralized with ammonia and amines, and dissolved in water-soluble solvents. Howard includes as propellants the lower molecular weight hydrocarbons flourocarbons, etc., $CO_2$, nitrous oxide, cyclo-propane, etc. Among the host of non-distinguishable propellants dimethyl ether was named as useful. The useful water content was limited however to preferably less than 8%.

Broadhead U.S. Pat. No. 2,985,602 teaches the concept of producing a low molecular weight alkyd resin having an acid value between 6 and 25, made water-dispersible by neutralization with lithium hydroxide.

Vasishth et al U.S. Pat. No. 4,240,940 teaches an aerosol paint which is capable of being cleaned up with water containing from 8%, but preferably less than 1% of water in which the binder vehicle solids are a water-reducible alkyd resin dissolved in a solution of Butyl Cellosolve and n-butanol. Other solvents for the water-reducible alkyd are ethylene glycol monobutyl ether, Butyl Carbitol and V. M. & P. Naptha.

Howard U.S. Pat. No. 4,125,499 uses organic co-solvents including acetone, ethers, ethylene glycol n-butyl ether, etc., with about 5% of water with some water-soluble alkyd resins (Aquamac 1200, Kelsol 3902, etc). Aliphatic hydrocarbons and halofluorocarbons and methyl ethers including dimethyl ether are used in propellant admixtures. Again water is limited to not more than 10%.

Suk U.S. Pat. No. 4,265,797 teaches manufacture of an aerosol paint requiring water-miscible propellants, dimethyl ether. The resins disclosed appear to be very similar to those disclosed in U.S. Pat. No. 2,795,564 (Rohm and Haas).

Rotheim U.S. Pat. No. 1,892,750 teaches use of dimethyl ether among other propellants for dispensing a spray of liquid from a pressurized container.

Attention is also directed to a Suk Belgium patent No. 890,564 of Jan. 18, 1982 which contains from 10–50% water and from 0–50% dimethyl ether and another propellant in conjunction with up to 45% polar organic co-solvents in an aqueous aerosol paint system.

DETAILED DESCRIPTION OF THE PREFERRED EMBODIMENT OF THE INVENTION

This invention comprises a ready-to-spray paint system in a pressurized aerosol container. The paint in the original liquid state is water-reducible and contains about 20 to 40% water in the final aerosol paint package. It is more often the fact that water-containing prior paint systems have relatively low specular reflection of gloss. Gloss of the deposited film is generally measured at an angle of 60° when compared with gloss of a black mirror at the same angle at 100%. Most often, glosses of water-reducible paint systems, and particularly those deposited from aerosol paints containing water-thinnable contents, have glosses less than about 85% at a 60° angle.

The aerosol paints of this invention have developed improved gloss qualities. The propellant phase has excellent miscibility in the water component as well as with the film-forming water-soluble monomer modified alkyd resins or varnishes which provide the non-volatile film-forming binder solids of the system before incorporation of pigments which provide opacity or covering quality to the aerosol paints herein, the liquid paint system containing the propellant in a liquified state. The pressurized liquid paint system (before pigmentation) is transparent and is not in an emulsified or opaque system, or a plural phase system. It is a substantially clear homogeneous system and is stable under a wide range of storage conditions. Non-pigmented aerosol paints are useful in applying clear transparent decorative coatings.

The essentially water-soluble film-forming binder solids of the aerosol paints of this invention can aptly be described as water-soluble monomer modified alkyd resins having acid values above the conventional organic solvent soluble, water-insoluble conventional alkyd resins more commonly used of less than about 10 A.V. Here the acid values are usually above about 30 and less than 80, and the molecular weights are believed to be about 2,000–6,000. In most instances at least a minor proportion of the monomer modification may be a drying oil fatty acid. However, the nomenclature also includes further modification during polymerization of these essential reactants with monomers including as illustrative; drying oils, styrene, methyl acrylate, ethyl acrylate, methyl methacrylate, ethyl mehacrylate, urethane modified and "chain stopped" alkyds having a non-volatile binder solid content of from about 65–85%. The volatile portion usually includes water-soluble thinners which reduce the viscosity for easy handling. Monomer modified alkyds useful for the purposes herein are commercially available from a number of sources as are well known to the coatings art.

It has also been found desireable to the ends of this invention to water-solubilize the high acid value water-dispersible monomer modified alkyd resins of this invention initially and at least in part with inorganic lithium bases as disclosed by Broadhead in U.S. Pat. No. 2,985,602. Advantageous results have been observed in the ultimate quality of the aerosol paint films when this method has been followed and a preferred composition is thereby obtained. Prior art amines and ammonia are also useful as the sole alkaline agents.

The general practice in the prior art of producing water-dispersible monomer modified alkyd resins has been to neutralize the excess acidity of these alkyds as well as to adjust the pH to above about 8 with water-soluble low molecular weight amines and ammonia. Such practices are not to be precluded here, however, as they are operative and useful.

In the water-soluble aerosol paints of this invention it has been found possible to neutralize, at least in part, the foregoing acid values of the non-volatile binder vehicle of the paint system from about 10% to as high as about 50% with a fixed alkali. While sodium and potassium are operable, improved durability is obtained by use of the smaller lithium ion for an initial water-solubilizing step with one or more of the selected water-soluble monomer modified alkyds of this invention. However, as the pH of the final products should preferably be above about 7.5, and preferably not above about 8.8 (because of possible hydrolysis of the polymeric esters), it is preferred to use a volatile (ammonia or amine) alkaline material in making the final adjustment in the pH of the paint system for aerosol end use. Aqueous ammonia solutions commonly provide means to this end. It is also permitted to use lower molecular weight amines, illustratively alkyl and alkanol amines including methyl, ethyl, methyl, methanol amine, etc.

The above neutralization procedures provide essential water-reducibility and transparency of the non-volatile relatively high acid value resinous binder portion of the paint system. However, it is observed that these "soap" solutions contribute to foaming problems when using the prior art water-insoluble gaseous propellants as the major part of the pressurizing propellant phase.

As is well understood in the prior art of conventional, water-insoluble and essentially water-free (less than 10% of water) aerosol paint systems, the propellants have heretofore been primarily low molecular weight gaseous hydrocarbons and fluorohydrocarbons ("Freons") which are not generally considered water-soluble products. A common problem (associated with the extremely heterogenous non-soluble in-water formulations of aerosol paints of this phase complexity) was foaming, a common difficulty requiring fine formulation balances to keep foaming absent or controlled. Foam cavitation in deposited film coatings often leads to permanent film imperfections.

In the combination of the water-soluble resin binders of this invention, the use of lower molecular weight water-soluble gaseous ethers at standard temperature and pressure as the propellant was found particularly advantageous.

Among the propellants independant of cost considerations found useful in the aerosol paints of this invention were methyl ethyl ether, dimethyl ether, propylene oxide 1-3, and propylene oxide 1-2. Propylene oxide 1-3 has greater water-solubility of compartibility and is infinitely water-soluble. The 1-2 homologue is soluble to the extent of about 33 parts per 100 parts of water and is operationally useful.

However, dimethyl ether has recently became commercially available as a propellant in aerosol systems. It has since been investigatively employed in development work of the aerosol paints of this invention. It has been found useful, not only as a major porportion of the propellant phase essential to efficient atomization of the aerosol paint for application purposes, but also because it provides excellent co-solvency in conjunction with the specific blends of other water-soluble organic solvents, individuals of which have been an active part of paint technology for a long time, including as illustrative, lower molecular weight alcohols and ketones, the alkylene glycol mono-butyl ethers and esters. These solvents also exhibit co-solvency in water-organic solvent blends tending to keep the heterogenous water-soluble liquids of the paint solids compositions molecularily dispersed as they are deposited from the aerosol spray nozzle in a fine spray compatible and homogeneously dispersed. As the more volatile propellant phase evaporates from the deposited film, the heavier show evaporating solvents aid in establishing good cohesion of the wet film to the substrate. High gloss levels of aerosol paints containing a water-phase have heretofore been difficult to produce due to the heterogeneity of the paint film deposit. Compatibility of the propellant, it is believed, with both the water phase and the organic phase, contributes to the general high gloss levels and relatively fast film dry of the water-soluble aerosol paints as are herein disclosed.

Having introduced the importance of the solubility of the propellant in the aqueous phase, and the finding that superior films appear to be developed from aerosol (pressurized) spray paints containing water-soluble propellants in conjunction with the combination of water-soluble monomer modified alkyd resins of low molecular weights of from about 1,800 to preferably not about about 6,000, we introduce hereafter illustrative mention and review of a number of commercially available products within this special group of film-forming resins available in the paint art included herein and in the examples.

Useful water-soluble monomer modified alkyd resins understood to include as illustrative Spencer-Kellogg (Division of Textron) resins, Kelsol 3900, Kelsol 3902, Kelsol 3905, Kelsol 3921, Kelsol 3961 and Kelsol 3970. Cargill also has a number of useful products understood to be in the above general class which include Cargill WR7405, Cargill 7418 and Cargill Alkyd 7201-80. Spencer-Kellogg has Arolon 969, 363, 376 and 557-D-70. McWhorter has Aquamac 1000, 1021 and 1200. Reichhold Chemical has a series of water-dispersible alkyd resins including Beckosol 13-400, Beckosol 93-992 and 93-996.

Where the percentage of monomer modification (particularly drying oil modification) is increased to what are described as "medium" length or "long" oil modified alkyds, assured compatibility has been indicated in the nature of air-dryed films.

Present experience indicates problems of foam formation having been noticably reduced when the presence of anionic emulsifiers of the commercial classes used as wetting agents and surfactants are present, if at all, in very small quantities.

The film-forming binder portion of the water-containing aerosol paints of this invention are broadly useful when the organic film-forming solids are of the low molecular weight monomer water-soluble modified alkyd resin solids class. Small amounts of other film-forming solids, driers, anti-foam agents and preservatives may also be included for special effects, but are not an essential part of the advance in the art herein. However, they are not to be considered excluded from the concepts developed.

Two general classes of volatile organic solvents are often used in preferred combinations. These include the simple lower molecular weight alcohols, ketones and esters as well as the higher molecular weight co-solvents, both classes of which are water-soluble or water-miscible. Volatile solvents which are a part of the freshly deposited paint film constitute from about 5% to less than about 30% of the aerosol paint (exclusive of the volatile solvent propellants essential to aerosol applications).

Illustrative of the first group are methanol, ethanol, isopropanol, butanol, acetone, diethyl ketone, ethyl acetate, etc.

Illustrative of useful co-solvents are well known commercial products known as "Cellosolves," Carbitols, etc., which include glycol ethers, illustratively ethylene glycol mono alkyl ethers (ethylene glycol mono butyl ether, etc.) and ethylene glycol mono alkyl ether acetates (ethylene glycol mono methyl ether acetate, etc.).

The aerosol paints or coatings of this invention may be pigmented or not pigmented depending upon the opacity quality and color of the dry decorative and protective film desired. Clear coatings depositing high gloss films may contain no pigmentation. These are free from opacity or hiding and are essentially transparent and clear. If a dull film is wanted, inert pigments (pigments with a low index of refraction) are useful in relatively small amounts.

The completely packaged, ready-to-use, formulated aerosol paints of this invention consist essentially of from 5 to about 25% total of organic polymeric film-forming solids, from about 15 to 40% water, from 5 to about 30% of volatile organic solvents for the liquid paint exclusive of propellants, and 20 to 45% of a principally pressure-liquified oxygenated co-solvent propellant gas selected from the group consisting of dimethyl ether, methyl ethyl ether, diethyl ethyl and propylene oxide 1-2 and 1-3 providing an internal pressure in the aerosol packaged paint of from about 2 to 6 kg/cm$^2$.

Pigments may include those generally in use in water-reduced paint systems and they may be "inert" (free from opacifying capacity) or "high hiding" as illustrated by titanium dioxide or carbon black. Anti-rust and corrosion resistant coatings have been formulated by selections of corrosion inhibiting pigments including calcium barium phosphosilicates (Halox BW191) and barium metaborates (Busan 11-M-1), chromates, molybdates and others are not to be excluded for some applications.

The use of dimethyl ether as a propellant in aerosol paints has recently been promoted and developed by a large supplier (DuPont) and has been disclosed as a useful propellant in the published prior art. However, from the prior art known, there appears to be a failure to recognize the specific value in water-containing aerosol paint systems and the functional value of the above ethers in the package as a beneficial co-solvent for aqueous monomer modified alkyd resin polymers of the class essential in the combinations hereinabove disclosed.

While it is not a desire to be bound by theory, the increased homogeneity of the aerosol paint system, including the water phase, the polymeric binder phase, and the ancillary solvents present brought about in the above described pressurized system, suggests a synergistic co-action of the water-soluble propellant, the water-miscible volatile solvents, and the water-dispersible polymeric binders to produce an improved quality in the freshly deposited spray applied film of paint as well as in the quality of the dried coating of paint film resulting upon exposure to time and use.

The amount of dimethyl ether or related ether pressurizing (gas) liquid present in the total propellant in the aerosol paint package may be from greater than 10% of about 70% by weight of the standardized paint composition so pressurized. It is also preferred to employ at least about 35% of the propellant phase by weight as one of the ethers described, such as dimethyl ether.

As is well known in paint formulation, there are a host of minor additives employed in paint systems too numerous to identify completely. However, small amounts of plasticizers, metallic driers such as cobalt soaps, anti-skinning (anti-oxidants) agents to prevent premature oxidation of the liquid paint system, flow-control agents (Dow Corning P.A. #14) to overcome orange peel in spray applied coatings, coalescent solvents, drier activators (Activ-8), wetting agents (FC 430), anti-foaming agents, etc.; all are potential sources of minor paint additives which may be useful and used in the aerosol paint formulations of this invention without departing from the spirit of the disclosure for the scope of the appended claims. Total miscellaneous paint additives will generally constitute less then about 5% by weight of the total aerosol can content when factory filled for shipment.

The procedure found useful in the examples below follows a general plan of many paint manufacturers. First, a base product is prepared by mixing the pigment (if present) with a commercially available water-soluble monomer modified alkyd resin having an acid value from about 30 to less than 80, preferably 35-55; further added are 50-80% of binder solids. The base product has approximately one-third the water, about one-fourth of the alkaline agent (lithium bases are dissolved in water), ammonia or an amine, cobalt drier and drier catalysts or other drier adjuvant electively along with a portion of the water-soluble or miscible organic co-solvents. Many additives use for special effects and special ends in general paint manufacture can be added at this point, or they may be added to the pigmented product after grinding (pigment dispesion) in what may be termed the "let down" or "thin down" portion of the total formulation. As the volume put through the grinding phase carries a greater cost charge, it is customary to make most convenient additions subsequent to the grinding step. The grinding portion may be sufficiently fluid, however, to function in the equipment selected for the pigment dispersion phase step.

It is convenient to produce the dispersion of the above system in a bead mill or sand mill, illustratively as S. W. Mill (T.M.). Ball mills are also excellent. Electively, other trace or minor additives may be included in the above list of components. After the dispersion step has preferably reduced the pigment to a 7 Hegman grind gauge reading for gloss paints, the base is further reduced by adding the defoamers and the remaining alkaline agent essential to adjust the pH to a pre-determined level. The final pH of the paint base is preferably adjusted to 8.0-8.5 with aqueous ammonia or amine rather than a fixed alkali.

The above process produces a paint concentrate which for aerosol paint use is further thinned down or reduced in solids or non-volatile liquids including the remainder of the volatile co-solvents, water, and remaining minor additives, illustratively anti-skinning agents, etc., thereby reducing the viscosity of the paint system to a sprayable viscosity.

The prepared paint product liquid is delivered to the pressure filling apparatus where from about 20% to about 40% by weight of the net weight of the can, the propellant phase, is used to pressurize the specialized aerosol can. Small amounts of hydrocarbons including propane, butane, and isobutane may be used to replace up to about 25% of the oxygenated ether propellant, if one elects to do so.

A comparison of prior art products of the general class containing water with those falling within the scope of the drying times of the films of products herein are that overnight dry is generally rated as "hard" in its illustrative examples of record.

Having described the invention in general terms, the following specific examples illustrate the best mode presently known to reduce the invention to practice. Parts are by weight unless otherwise specified.

EXAMPLE 1

| | | (Black Enamel) |
|---|---|---|
| (1) | 18 parts | carbon black |
| (2) | 3 parts | colloidal silica |
| (3) | 15 parts | propoxy propanol |
| (4) | 1 part | defoaming agent (Patcote 550) |
| (5) | 70 parts | acrylic modified water dispersible alkyd (Reichold Lustrasol 93-996) |
| (6) | 5 parts | Butyl Carbitol |
| (7) | 3.5 parts | ammonia (28%) or (lithium hydroxide aqueous 25%) or triethyl amine |
| (8) | 180 parts | water |
| (9) | 3 parts | cobalt paint drier |
| (10) | 1.5 parts | drier catalyst ("Activ-8") |

The above ingredients are thereafter dispersed. A sand mill, pebble mill, or conventional ball mill may be used. A Hegman reading of 7 was obtained.

The above grinding phase was "let down" with:

| | | |
|---|---|---|
| (11) | 281 parts | resin of line 5 |

-continued

| (12) | 13 parts | 28% NH₄OH |
|---|---|---|
| (13) | 1 part | silicone pigment wetting agent (SF 69) |
| (14) | 1 part | silicone defoamer (Patcote 550) |
| (15) | 2 parts | anti-skinning agent (anti-oxidant) |
| (16) | 400 parts | water |

These were used to reduce the mill charge. The pH was adjusted to between 8.0-8.5 with ammonia, trimethyl amine or monoethanol amine.

The pH adjusted liquid paint was packaged in an aerosol can. To each 37 parts of the paint concentrate were added 38 parts of solvent blend and 25 parts of the propellant, dimethyl ether. The solvent blend contained from 50-60% of acetone or ethanol or isopropanol, alone or in various combinations, 10% of butanol-2, 0-10% of propoxy propanol, and 10% of a heavy co-solvent (Butyl Cellosolve) along with 20-40% of water.

EXAMPLES

Example 1 details the general procedure followed in manufacture of pigmented aerosol paints of the water-soluble class to which this invention is directed.

In all the subsequent examples the same general procedure of Example 1 is followed. The order of addition does not generally depart from Example 1, although where no pigment is present, as in the case of a clear vehicle (varnish coating), milling is not resorted to. Adjustment of the pH to neutrality before milling is suggested. Use of lithium hydroxide as at least a part of the neutralizing base is also suggested. More commonly in the prior art, neutralization of the acid values of the resin and pH adjustment to the alkaline range is necessarily accomplished either prior to the milling step or just prior to filling the pressurized containers.

| | Examples | | | | | |
|---|---|---|---|---|---|---|
| | 2 Black | 3 White | 4 Red | 5 Blue | 6 Green | 7 Clear |
| Carbon Black | 0.8 | | | | | |
| Titanium Dioxide | | 8.8 | 0.3 | 3.5 | 0.6 | |
| B.O.N. Red (organic pigment) | | | 3.2 | | | |
| Phthalocyanine Blue | | | | 1.3 | | |
| Phthalocyanine Green | | | | | 1.2 | |
| Yellow Iron Oxide | | | | | 2.3 | |
| Colloidal Silica | 0.1 | 0.1 | 0.2 | 0.1 | 0.1 | |
| Aqueous Ammonia (28%) (D) | D | D | D | D | D | D |
| Monomer Modified Alkyd Resin* | A-14.0 | B-14.0 | C-14.0 | C-12.6 | C-10.8 | C-13.0 |
| Cobalt drier (Nuo Cure CK-10%) | 0.4 | 0.4 | 0.4 | 0.2 | 0.2 | 0.2 |
| Zirconium drier (12%) | | | | 0.3 | 0.3 | 0.3 |
| Calcium drier (5%) | | | | 0.2 | 0.2 | 0.3 |
| Triethyl amine | 1.0 | 0.7 | 0.9 | 0.8 | 0.7 | 0.8 |
| n-Butanol | | | | 2.8 | 2.4 | |
| Butoxy ethanol | | | | 2.1 | 1.8 | |
| Propoxy propanol | 5.0 | | 4.0 | | | 3.0 |
| Isopropanol | | 10.5 | 14.0 | 10.0 | | 7.5 |
| Acetone | 14.0 | | | 7.5 | 12.0 | 7.5 |
| Ethoxy ethanol | | 6.0 | | | | |
| 10% Fluorinated alkyl ester (FC 430) | 0.3 | 0.3 | 0.3 | 0.2 | 0.2 | 0.2 |
| Water | 34.4 | 29.2 | 32.7 | 28.4 | 27.2 | 32.2 |
| Dimethyl ether (propellant) | 30.0 | 30.0 | 30.0 | 30.0 | 40.0 | 35.0 |

*A — WR-4005-BC-70 (Reliance) - (14 parts - acrylic modified ion)
B — Kelsol 3961 (Spencer-Kellogg) - (14 parts - chain stopped modification)
C — Beckosol 13-400 (Reichhold) - (14 parts - medium oil modification)
D — Adjust pH to 8.0-8.5 - (note final pH adjustment)

| | Examples | | | | | | | |
|---|---|---|---|---|---|---|---|---|
| | 8 Black | 9 White | 10 Red | 11 White | 12 Black | 13 Blue | 14 Primer | 15 Primer |
| Carbon Black | 0.9 | | | | 1.0 | | 0.15 | |
| Titanium Dioxide | | 8.0 | | 8.2 | | 3.5 | 6.5 | |
| B.O.N. Red | | | 3.5 | | | | | |
| Collodial Silica | 0.15 | 0.15 | 0.15 | 0.1 | 0.1 | 0.1 | 0.1 | 0.10 |
| Phthalocyamine Blue | | | | | | 1.0 | | |
| Red oxide (iron) | | | | | | | | 6.0 |
| Magnesium Silicate | | | | | | | 6.5 | 3.0 |
| Barium metaborate (Busan 11-M-1) | | | | | | | 3.25 | |
| Calcium phospho silicate (helox BW-191) | | | | | | | | 6.0 |
| Aqueous ammonia (28%) | | 0.25 | | 0.3 | | | | |
| Triethyl amine | | 0.4 | 0.35 | 0.35 | | 0.65 | 0.7 | 0.65 |
| Diethyl amine | 0.5 | | | | 0.6 | | | |
| Lithium hydroxide | | | 0.20 | | | | | |
| Propoxy ethanol | | 6.5 | | | | | | |
| Isopropanol | 14.0 | 3.5 | | | | 5.0 | | |
| Acetone | | 6.5 | 15.0 | 16.5 | 16.5 | 10.0 | 16.25 | 15.0 |
| Butoxy ethanol | 3.5 | | 1.2 | 1.5 | 1.5 | 2.0 | 2.0 | 1.8 |
| n-Butanol | | | 3.0 | 3.5 | 3.5 | 3.5 | 2.5 | 2.4 |
| Water-soluble monomer modified alkyd resin | B 14.0 | F 13.0 | G 12.8 | H 13.0 | K 14.0 | L 14.0 | C 11.7 | C 10.8 |
| Drier catalysts | .35 | .35 | .40 | .45 | .45 | .45 | .70 | .60 |
| 10% FC 430 | 0.2 | 0.2 | 0.2 | 0.2 | 0.2 | 0.2 | | |

| | | | | | | | | |
|---|---|---|---|---|---|---|---|---|
| -continued | | | | | | | | |
| Anti-skinning agent | 0.1 | 0.1 | 0.1 | 0.1 | 0.1 | 0.1 | 0.05 | 0.05 |
| Water | 36.3 | 26.0 | 23.0 | 21.0 | 27.0 | 25.0 | 14.6 | 13.6 |
| Dimethyl ether | 30.0 | 35.0 | 40.0 | 35.0 | 35.0 | 35.0 | 35.0 | 40.0 |

B — Kelsol 3961 - (Spencer-Kellogg) - chain stopped
F — Beckosol 93-992 - (Reichhold) - chain stopped
G — Aquamac 1021 - (McWhorter) - chain stopped
H — Kelsol 3970 - (Spencer-Kellogg) - silicone
C — Beckosol 13-400 (Reichhold) - medium oil length
K — Aquamac 1200 - (McWhorter) - urethane modified
L — Acrylic 10-1306 (Freeman) - acrylic monomer modifed The water-soluble monomer modified alkyd resins at alkaline pH after neutralization as shown in the foregoing Examples are representative and identified by the letters A through L are generally identified as to monomer type or modification as detailed herein.

chain stopped alkyds—B, F & G;
silicone modified—H;
urethane modified—K;
acrylic modified—A and L;
drying oil modified—C;

The water-soluble monomer modified alkyd resins herein illustrated herein are representative selections of the state of the art. Most are modified with drying oil fatty acid monomers to obtain the requisite coating composition qualities of the prior art non-water-soluble alkyd resin vehicles.

While the principal function of the water-soluble propellant is to provide atomization upon application of the aerosol packaged paint system, two other specific advantages are obtained. One is the development of a homogeneous dispersed phase in the pressurized package, which upon application in a film, is essentially foam-free. A second advantage is when in combination with the other volatile organic solvents illustrated in the various examples including acetone, the various low molecular weight alcohols and oxy alcohols, superior qualities of clarity and gloss of the dried films are obtained without development of surface irregularities.

Use of the fluorinated alkyl esters identified as "Fluorads" are also effective in improving the surface qualities of the dry films as compared with other surfactants heretofor commonly used to insure against foam development in aerosol films.

The acid values of the monomer modified alkyd resins which have been found to produce clear transparent liquids (in the absence of a pigmenting phase) and deposit clear films, have acid values between 30 and 80. Selection within this range is preferred and acid values above 30 and less than 80 are suggested for better overall film quality when dry. Heretofor the prior art has found a water content above 10% and preferably 8% is a maximum for use in the final aerosol paint products when packaged.

In order to obtain the preferred clarity of the water-soluble binder phase, it is preferred that the monomer modified alkyd resins have molecular weights below about 10,000 and from about 1,800 to less than 5,000 is a general range of the products commercially available. As a rule of thumb, the molecular weights should be sufficiently low so that the clear, unpigmented coating compositions in aqueous solution are at most only slightly translucent at a pH range of about 7.5 to 8.5. Emulsion particulates are overly large and excluded (about 0.1 to 1.0 microns) colloidal particles below about 0.1 and preferably not larger than about 0.05 and are tolerable in minute proportion.

What is claimed:

1. A protective and decorative aerosol coating composition adapted for application from a pre-packaged pressurized spray container which comprises from about 15% to about 40% by weight of water as the principal solvent phase; from about 5% to less than 30% by weight of a water-soluble, volatile organic solvent selected from the group consisting of alcohols, ketones and/or esters and admixtures thereof, having less than six carbon atoms in their chemical structures, from about 20% to about 45% by weight of a liquified propellant under pressure, the major proportion of which is an oxygenated ether selected from the group consisting of methyl ethyl ether, dimethyl ether, propylene oxide 1-3 and propylene oxide 1-2; from about 5% to about 20% by weight of a non-volatile, substantially water-soluble, film-forming, monomer-modified organic polyester polymer whose normal acid value is greater than 30 and not more than about 80, which acid value is neutralized with a base selected from the group consisting of ammonia, amines, basic inorganic lithium compounds and admixtures thereof, and from 0 to about 15% by weight of a paint pigment dispersed in said aqueous solution above; said neutralized aqueous polymer solution being substantially free from insoluble polymer particulates greater than 0.1 microns in diameter.

2. The composition of claim 1 where the propellant liquid component contains not more than 10% by weight of a normally gaseous hydrocarbon propellant liquid.

3. The composition of claim 1 where the major proportion of the liquid phase propellant is dimethyl ether.

4. The composition of claim 1 where the water-soluble, base-neutralized, film-forming polymer has further monomer modification in addition to a drying oil fatty acid monomer modified alkyd resin.

5. The composition of claim 4 where the film-forming monomer modified alkyd resin comprises a monomer modified alkyd resin having a portion of said monomer which is a drying oil fatty acid moiety.

6. The composition of claim 4 where the modifying monomer is selected from the group consisting of styrene, silicones, lower alkyl acrylates, eg; methacrylates and ethyl acrylates.

7. The composition of claim 1 where the base-neutralized film-forming organic alkyd polymer is a drying oil urethane monomer modified alkyd resin.

8. The composition of claim 1 where the acid value of the base-neutralized, film-forming polymer is reduced with a lithium base to less than about 7 and a final pH of from between 7.0 to 9 is obtained with a base selected from the group consisting of ammonia and amines.

9. The composition of claim 5 where the drying oil modified polyester is further interpolymerized with a monomer selected from the group consisting of silicone, styrene, lower alkyl acrylates including methyl and ethyl methacrylates and ethyl acrylates.

* * * * *